(12) United States Patent
Larsson et al.

(10) Patent No.: US 8,391,802 B2
(45) Date of Patent: Mar. 5, 2013

(54) LINK ADAPTATION AND POWER CONTROL WITH CONSUMED ENERGY MINIMIZATION

(75) Inventors: Peter Larsson, Solna (SE); Zhang Zhang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 776 days.

(21) Appl. No.: 12/278,851

(22) PCT Filed: Feb. 8, 2006

(86) PCT No.: PCT/SE2006/000176
§ 371 (c)(1),
(2), (4) Date: Aug. 8, 2008

(87) PCT Pub. No.: WO2007/091930
PCT Pub. Date: Aug. 16, 2007

(65) Prior Publication Data
US 2009/0061774 A1    Mar. 5, 2009

(51) Int. Cl.
*H04B 1/00*      (2006.01)
(52) U.S. Cl. .......................................... 455/69
(58) Field of Classification Search .................. 455/69
See application file for complete search history.

(56) References Cited

U.S. PATENT DOCUMENTS

2006/0205443 A1*   9/2006   Simoens et al. ............. 455/574

* cited by examiner

*Primary Examiner* — Matthew Anderson
*Assistant Examiner* — David Bilodeau (57) ABSTRACT

The invention relates to the control and adaptation of transmit parameters for wireless communication between a transmitter (TX) and at least one receiver (RX) to provide joint power and link adaptation. A basic idea of the invention is to collectively determine the transmit duration (T) and transmit power (P) of the transmitter based on minimization of a given objective function representative of total consumed energy, on both the transmitting side and the receiving side, with respect to transmit duration and/or transmit power. In effect, this means that link transmit parameters are determined based on the energy consumption on both the transmitting side and the receiving side. In addition, both transmit power and transmit duration are varied, while minimizing overall consumed energy.

28 Claims, 7 Drawing Sheets

LINK ADAPTATION AND POWER CONTROL WITH CONSUMED ENERGY MINIMIZATION

TECHNICAL FIELD OF THE INVENTION

The present invention generally relates to communication in wireless networks, and more particularly to a new strategy for controlling link transmit parameters for communication between a transmitting side and a receiving side in such a network.

BACKGROUND OF THE INVENTION

The control and adaptation of transmit parameters on the link level generally include issues such as link adaptation and power control.

Link adaptation allows transmission parameters (normally modulation and coding scheme) used for communication to be adapted in order to optimally exploit the potential of the communication channel, usually to provide high data transfer rates along with low bit error rates.

Power control is used in numerous wireless systems to enable "efficient" communication without expending unnecessary power resources.

Because communicating devices, such as mobile devices or similar short-range communicating devices, in many instances are dependent on battery power there is a general need to minimize their energy consumption.

From an energy consumption perspective, low transfer rates at relatively high transmit power levels are of course undesirable since low rates translate into long transmit durations, which at high power translate into high energy consumption levels. On the other hand, it may not be possible to realize reliable communication at high transfer rates using low transmit power levels so low energy consumption is not always easy to realize.

In the technical field of multi-hop routing, which relates to communication between source and destination nodes along a route over several hops, traditional minimum power routing strives to ensure that the selected route minimizes accumulated link transmit power under the assumption of flexible power setting (and different path loss for each link), but a single fixed transmit duration common for all links.

It should also be understood that an energy or power consumption analysis limited to transmit power levels only considers the radiation-related energy consumption for transmitting information.

As concluded in reference [1], there is little practical information available about the energy consumption behavior of well-known wireless network interfaces, and device specifications do not normally provide information in a form that is helpful. Reference [1] describes a series of experiments that provide measurements of the energy consumption of an IEEE 802.11 wireless network interface operating in an ad hoc networking environment. The experimental data is presented as a collection of linear equations for calculating the energy consumed in sending, receiving and discarding broadcast and point-to-point data packets of various sizes. It is concluded in reference [1] that the energy consumption has a complex range of behaviors that are relevant to the design of network layer protocols.

There is indeed a general need for an improved strategy for controlling link transmit parameters for communication in a wireless communication network.

SUMMARY OF THE INVENTION

The present invention overcomes these and other drawbacks of the prior art arrangements.

It is a general object of the present invention to provide a new, improved strategy for controlling link transmit parameters for communication between a transmitter and at least one receiver in a wireless communication network.

In particular it is desirable to reduce the overall consumed energy of the devices participating in the communication.

It is a specific object to provide a novel strategy for link adaptation and power control.

These and other objects are met by the invention as defined by the accompanying patent claims.

The invention relates to the control and adaptation of transmit parameters for wireless communication between a transmitter and at least one receiver. A basic idea of the invention is to collectively determine the transmit duration and transmit power of the transmitter based on minimization of a given objective function representative of total consumed energy, on both the transmitting side and the receiving side, with respect to transmit duration and/or transmit power.

In effect, this means that link transmit parameters are determined based on the energy consumption on both the transmitting side and the receiving side. In addition, both transmit power and transmit duration (due to link adaptation) are varied, while minimizing overall consumed energy.

Preferably, the transmit duration and transmit power are determined collectively or jointly to provide for joint link adaptation and power control. This typically means that transmit duration and transmit power are determined in an integrated optimization process where overall consumed energy is minimized by varying both transmit duration and power.

It is possible to minimize the objective energy function with respect to both transmit duration and transmit power, where both the optimization variables can vary independently of each other. Alternatively, the considered transmit parameters may be coupled such that the parameters are dependent on each other. This means that when the value of a first one of the parameters varies, the value of the other second parameter also varies, not independently though, but rather as a function of the first parameter. In fact, the latter alternative often provides a computationally simpler solution to the optimization problem.

Normally, the total or overall consumed energy may be defined based on transmit duration, transmit power during the communication as well as radiation-unrelated consumed power on the transmitting side and the receiving side. The radiation-unrelated consumed power is preferably related to hardware-based processing at transmission and reception, and may typically be estimated as constant.

In some instances, for example when there is a fairly broad energy minima, it may be advantageous to consider also the expected communication quality when determining transmit power and duration and not be limited to the work only at the exact point of minimum energy. This means that it is possible to deviate somewhat from the exact minima, e.g. to obtain a communication quality that is more viable from a demodulation and decoding point of view, while still be operating sufficiently close to the real energy minima.

The control system responsible for determining transmit power and duration may be implemented in any network node within the communication network, as long as the relevant information is transferred to the considered transmitter for effectuating the link adaptation and power control. This typically means that a model representative of the energy consumption for one or more of the communicating nodes is made known to the node responsible for minimizing the total consumed energy. Preferably, however, the control system is implemented in the transmitter, or alternatively the receiver. When the control system resides in the transmitter, the control system is generally responsible for both the determination of transmit duration and power, as well as the actual link adaptation and power control. In this case, the transmitter preferably acquires information on the power consumption of the receiver(s) and typically also information on communication characteristics before initiating the minimization.

The invention is applicable to both unicast and multicast links. In the former case, the transmitter is operable for communication with a single receiver over a unicast link. In the latter case, the transmitter is operable for communication with multiple receivers on a multicast link.

The invention is of course generally applicable to any wireless communication network in which it is desirable to reduce the overall energy consumption for communication between a transmitter and a receiver. However, the invention has turned out to be especially useful for battery-driven short-range communicating devices. This is particularly interesting for sensor networks (often assumed to be an ad hoc network composed of small devices with limited battery resources), wireless personal area networks (WPAN) and to some extent also wireless local area networks (WLAN). Specific examples of relevant communication protocols include IEEE 802.11, but also 802.15.3 and 802.15.4.

The invention offers the following advantages:
Improved link adaptation and power control strategy.
Reduced energy consumption.
Longer and more stable operation of ad hoc networks composed of communicating devices with limited battery resources.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Throughout the drawings, the same reference characters will be used for corresponding or similar elements.

In many instances, such as for battery-driven short-range communicating devices, it is of interest to minimize or at least reduce the overall consumed energy of the communicating entities. This is particularly interesting for so-called sensor networks that are often assumed to be ad hoc networks composed of small devices with limited battery resources, or wireless personal area networks (WPAN) and to some extent also wireless local area networks (WLAN), for example when a WLAN is used together with a battery-limited PDA.

Figure 1A:
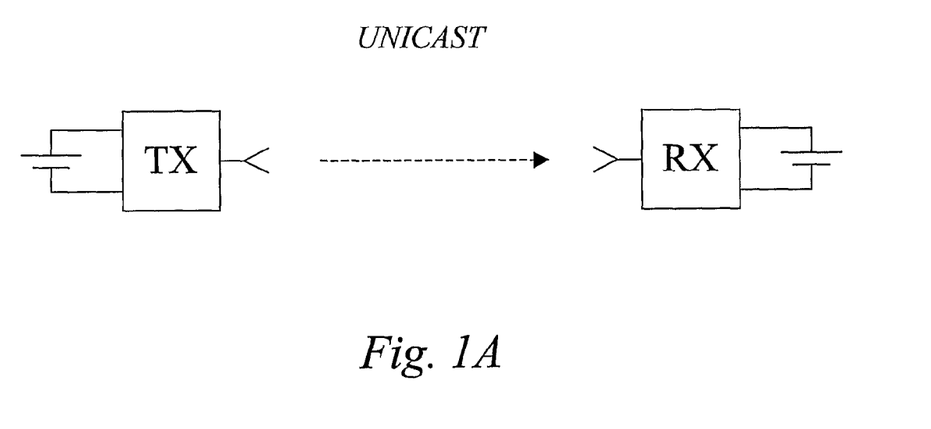
FIG. 1A is a schematic diagram of a transmitter communicating with a receiver over a unicast link.
Figure 1B:
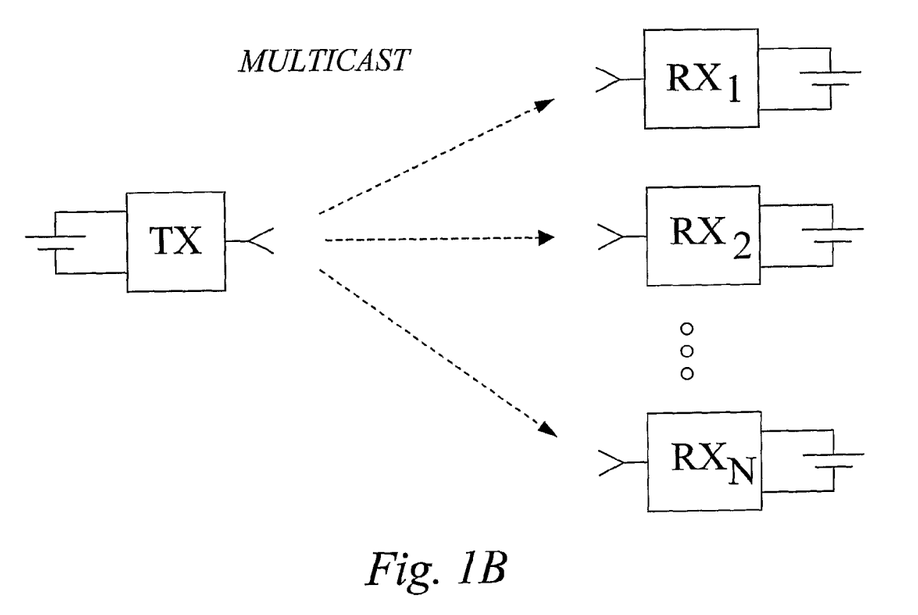
FIG. 1B is a schematic diagram of a transmitter communicating with multiple receivers over a multicast link.

The invention relates to the control and adaptation of transmit parameters for wireless communication between a transmitter and at least one receiver. The invention is applicable to both unicast and multicast links. In the former case, as the transmitter TX is operable for communication with a single receiver RX on a unicast link, as schematically illustrated in FIG. 1A. In the latter case, the transmitter TX is operable for communication with multiple receivers $RX_1, RX_2, \ldots, RX_N$, on a multicast link, as schematically illustrated in FIG. 1B.

In this context, a basic idea of the invention is to collectively determine the transmit duration and transmit power of the transmitter based on minimization of a given objective function with respect to transmit duration and/or transmit power. According to the invention, the objective function is representative of total consumed energy required for the communication on both the transmitting side and the receiving side.

Figure 2:
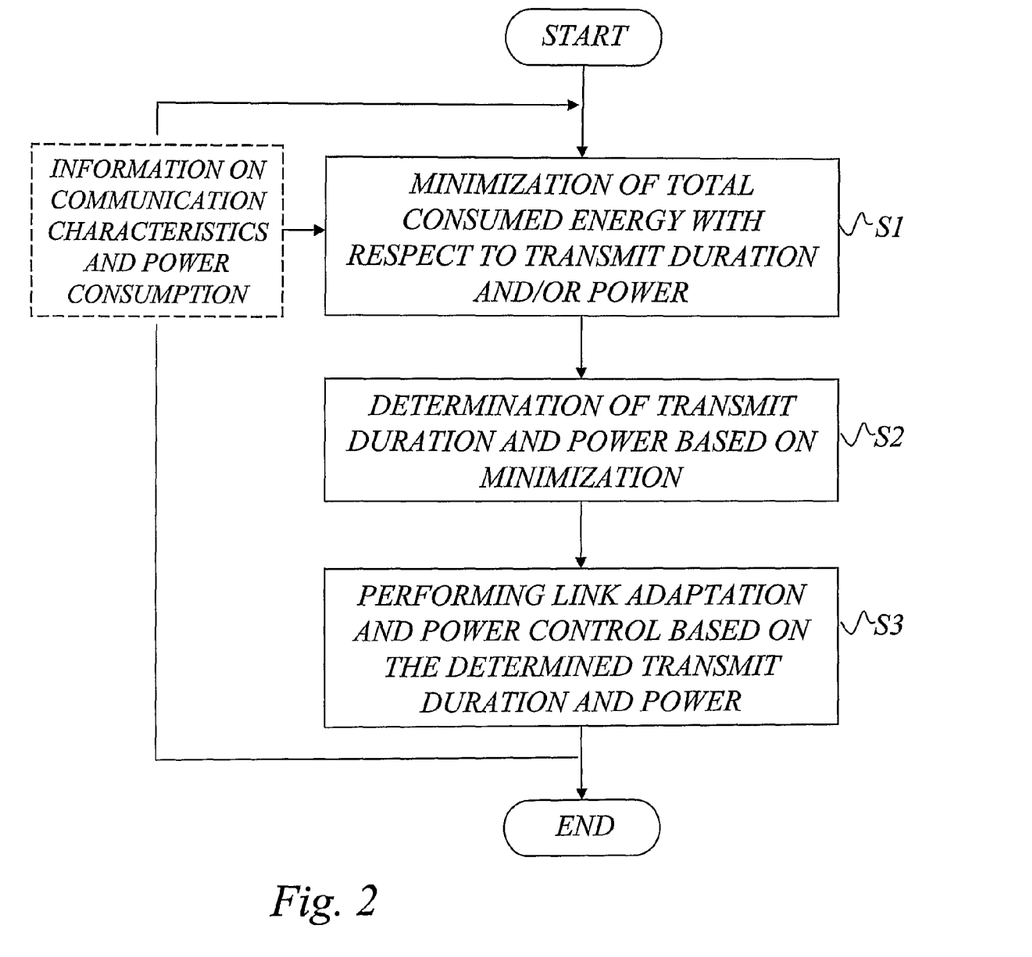
FIG. 2 is a schematic flow diagram of an exemplary method for control and adaptation of link transmit parameters according to a preferred embodiment of the invention.

With reference to the schematic flow diagram of FIG. 2 it can be seen that the total consumed energy is minimized with respect to transmit duration and/or transmit power in step S1, preferably by using suitable input on power consumption of the transmitter and receiver(s) and/or communication characteristics. The transmit duration and the transmit power are collectively determined, either as a direct result of the minimization or based on the minimization together with other factors such as expected communication quality, as indicated in step S2. In step S3, joint link adaptation and power control is performed based on the determined transmit duration and transmit power.

In contrast to the prior art, which have only taken power consumption on the transmitter side into account, the invention considers the energy consumption on both the transmitting side and the receiving side. In addition, both transmit power and transmit duration are varied, while minimizing the overall consumed energy, thereby supporting joint link adaptation and power control.

It is possible to minimize the objective energy function with respect to both transmit duration and transmit power, where both optimization variables can vary independently of each other. Alternatively, the considered transmit parameters may be dependent on each other such that when a first one of the parameters varies, the other second parameter also varies, but as a function of the first parameter.

System Model and Parameter Derivation

For a better understanding of the invention, it may be useful to describe the invention with reference to an exemplary system model of the energy consumption. For simplicity, it is assumed that that the communication system is a rate-controllable system that preferably is non-slotted (such as e.g. IEEE 802.11). It should though be understood that the invention is not limited thereto. For example, the invention can be useful for fixed resource sized systems. The invention may for instance be used to find an approximate optimal solution for a communications system using slotted channel access (such as time slotted systems). Then, the duration of a nodes transmission (as will be seen) is rounded of to the closest number of slots. Hence, multiple slots are potentially used for each packet transmission.

A key point of the invention is to provide for flexible transmit duration for a data packet. This contrast many of the prior art routing solutions, such as minimum power routing, where the transmit duration is held fixed over all links along a route.

Figure 3:
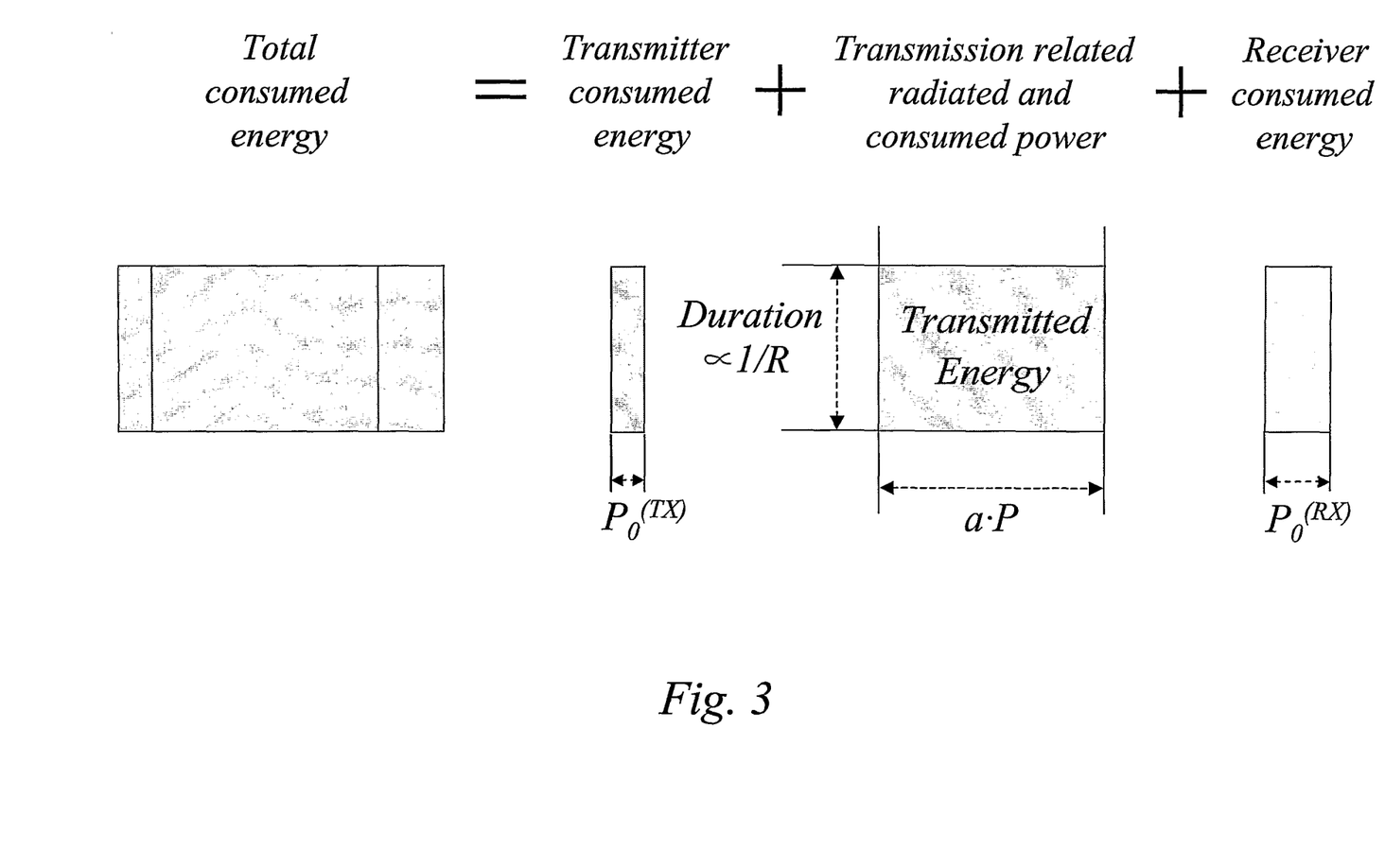
FIG. 3 is a schematic diagram illustrating an exemplary system model for overall energy consumption on both transmitting side and receiving side.

FIG. 3 is a schematic diagram illustrating an exemplary system model for overall energy consumption on both transmitting side and receiving side. A simple model is asserted here, where the total or overall consumed energy is defined based on transmit duration, transmit power during the communication as well as radiation-unrelated consumed power on the transmitting side and the receiving side.

As illustrated in FIG. 3, the total consumed energy for communication between pair of nodes (i.e. the unicast case) may for example be defined as the radiation-unrelated consumed transmitter energy plus the transmission-related radiated and consumed power ("transmitted energy") plus the radiation-unrelated consumed receiver energy. The transmit duration T is assumed to be inversely proportional to the data rate R, which may be adapted by changing modulation and coding scheme (link adaptation).

The "transmitted energy" is directly dependent on the transmit power P and the transmit duration T, according to the basic physical law E=P·T. The radiation-unrelated consumed power is preferably related to hardware-based processing at transmission and reception respectively, and may typically be estimated as constant. The constant power assumption for transmitting (apart from the power amplifier (PA) related power) and for receiving is a fairly good approximation since the (fixed) local oscillator power is normally larger than the signal processing power required for tasks such as baseband processing and decoding.

In this context, the total consumed energy normally includes an energy term defined as:

$$E_{Cons} = (aP + P_0) \cdot T, \quad (1)$$

where a is a factor used to reflect the power amplifier efficiency at the transmitter, P is the variable transmit power, $P_0$ is a constant term attributed to radiation-unrelated power consumption at the receiver and the transmitter, and T is the variable transmit duration.

The rate (or throughput) can generally be expressed as a function $f(\Gamma, P)$, where $\Gamma$ is representative of local link characteristics. The transmit duration can then be expressed based on the function $f(\Gamma, P)$. For example, the transmit duration T can be determined as:

$$T = \frac{L}{B \cdot f(\Gamma, P)} \quad (2)$$

where L is the number of bits in a packet, and B is the link bandwidth.

In the particular example of using the Shannon rate, the transmit duration can be defined as:

$$T = \left(\frac{L}{B \lg_2(1 + \Gamma P)}\right). \quad (3)$$

In an exemplary preferred embodiment, the consumed energy (per bit) for a pair of communicating nodes (unicast), based on the Shannon rate, can be written as:

$$E_{Cons} = (aP + P_0) \cdot (T + T_0) \quad (4)$$

$$= (aP - P_0)\left(\frac{L}{B \lg_2(1 + \Gamma P)} + T_0\right)$$

$$= P_0 T_0 (aP_0^{-1} P + 1)\left(\frac{LB^{-1}T_0^{-1}}{\lg_2(1 + \Gamma P)} + 1\right)$$

where T is the variable transmit duration per bit, $T_0$ is any fixed time (e.g. due to overhead that may not be rate adapted), $\Gamma$ is the path gain G to noise power W ratio (note that interference could also be added to the noise term), P is the variable transmit power, $P_0$ is a constant term attributed to the receiver and the transmitter "quiescent" (hardware-based, non-radiation) power consumption resulting when those are not in standby, $P_0=P_0^{(Tx)}+P_0^{(Rx)}$. The term $\alpha$ is used to reflect the power amplifier efficiency, i.e. since more power is consumed than radiated $\alpha>1$.

Since not only energy consumption related to transmit power is considered, and the energy consumption on both the transmitting side and the receiving side are taken into account, the consumed energy (4) has a distinct minimum and can thus be minimized with respect to the transmit power variable P and/or the transmit duration variable T in equation (4). As previously mentioned, it is possible to minimize the objective energy function with respect to both transmit duration and transmit power, where both the optimization variables can vary independently of each other. Alternatively, the considered transmit parameters may be coupled such that the parameters are dependent on each other. In the latter case, the consumed energy may be minimized with respect to the power variable, and the transmit duration is then determined as a function of the optimal transmit power since the duration is made dependent on the power. Equivalently, the consumed energy may be minimized with respect to the duration variable, and the transmit power is then determined as a function of the optimal transmit duration.

In the following, we will mainly describe the case where the energy function is minimized with respect to the transmit power variable P, and transmit duration is determined as function of $\Gamma$ and P.

The objective energy function (4) is non-linear, but the optimum transmit power (and hence also the duration/rate) may easily be pre-calculated off-line. It is sufficient to know the parameters: $\Gamma$, $\alpha P_0^{-1}$, and $LB^{-1}T_0^{-1}$ to produce a 2-D table for on-line look-up. For simplicity, and a reasonable assumption in most cases for packets containing large amount of data, it can be assumed that $T_0=0$. If so, it is it is sufficient to know $\Gamma$ and the ratio $\alpha P_0^{-1}$.

In a more general case, it is possible to determine coding and modulation scheme (i.e. the rate) based on a general formulation such as:

$$\hat{r} = \arg \min_{r_i \in R} f_r(LB^{-1}T_0^{-1}, aP_0^{-1}, \Gamma, r_i), \quad (5)$$

where R is the set of allowable rates given by the modulation and coding scheme, $r_i$ is the rate given by modulation and coding scheme i. Then the power is:

$$\hat{P} = \arg \min f_p(LB^{-1}T_0^{-1}, \alpha P_0^{-1}, \Gamma, P), \quad (6)$$

which must be selected from its definition range.

In scenarios where transmit durations comes in integers of timeslots, in contrast to the above example where transmission of arbitrary duration is assumed, the transmit duration needs to be rounded off. A possibility is to round off to closest largest number of time slots supporting the transmit duration determined in the continuous case. In doing so, the transmit power can be adjusted to minimize energy expenditure while ensuring that the link offers the desire rate. Note, in order to determine the number of slots, the packet length L and the slot duration $T_s$ need to be known.

Note that power may also only allow discrete values, so in practice the number of timeslots and power level may be searched for in discrete spaces.

While Shannon bounds have been used above, in practice, a distinct set of modulation and coding scheme may be used. This may also be taken into account in the rounding off process.

The above system model and equations are easily extended to the multicast case, including the energy consumption of all the considered receivers. For example, with a number N of receivers experiencing different path gain to noise power ratio, $\Gamma$ in the equations above may be determined as min ($\Gamma_1$, $\Gamma_2$, ..., $\Gamma_N$).

It is also possible to take a more detailed characterization of the receiver/transmitter-consumed energy into account. For example, it may be desirable to provide a more detailed model of the energy consumption with respect to the data rate, since the power consumption may depend on the modulation and coding scheme. A modulation and coding scheme (MCS) that corresponds to a higher rate may consume more power than a MCS that corresponds to a lower rate since a higher rate means that the information has to be processed in a faster pace.

In reference [2], the assumptions are that two users communicating on separate links with a central node are considered, and each has a given desired data rate. The sum interference energy (from the two users) is then strived to be minimized, by controlling the amount of relative channel utilization that is assigned to each user. In finding the optimum utilization factors, powers will be assigned to the users, given from the utilization factor, the given rate and propagation conditions. In contrast, the invention considers minimization of consumed energy that depends on both the receiver and the transmitter, whereas only the transmitter side is considered (then for the emitted energy). Moreover, in contrast to [2], the relative channel utilization is not a parameter in the invention.

Optimization with Realistic Modulation and Coding Schemes

For the case where practical rates cannot be modeled as a constant factor less than the Shannon rate, inverse throughput performance curves for different modulation and coding schemes (MCSs), possibly even taking retransmission effects into account, can be exploited instead of the Shannon rate. Assume that one expresses the maximum rate (or throughput) for all MCS as an approximation function which is a piecewise monotonically increasing function $f(\Gamma, P)$. The expression below can then used to find the optimum power. The optimum power can be derived from equation (7) below, which then gives the optimum link rate (and hence link mode).[1]

[1] Here it is assumed that $T_0=0$, but the invention is limited hereto.

$$\frac{d}{dP}\left(\frac{aP_0^{-1}P+1}{f(\Gamma, P)}\right) = 0 \quad (7)$$

This can, as before, be pre-calculated and stored in a 2-D look-up table based on the parameters $\Gamma$ and the ratio $\alpha P_0^{-1}$.

Figure 4:
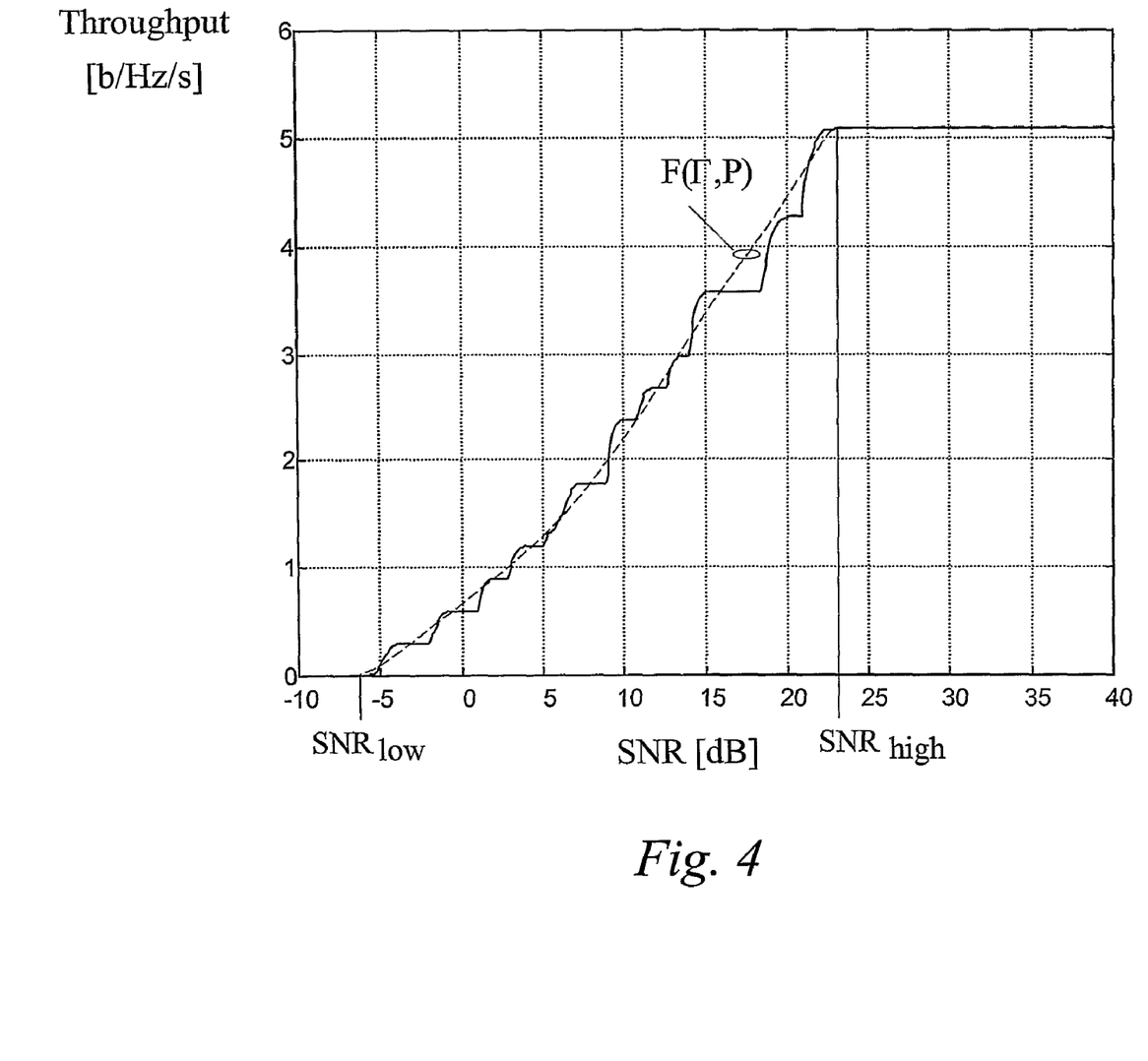
FIG. 4 is a schematic diagram of an exemplary graph illustrating maximum throughput of several realistic modulation and coding schemes versus signal-to-noise ratio (SNR)

FIG. 4 shows a piecewise monotonically increasing function $f(\Gamma, P)$ (dotted line) and the maximum throughput of a set of realistic (shown with solid line) modulation and coding schemes, e.g. Turbo coding with 4 QAM to 64 QAM, and accounting for retransmissions.

With reference to FIG. 4, it can be appreciated that below $SNR_{low}$ the link is infeasible since the result will provide an infinite transmit time. Above $SNR_{high}$ the transmit time is upper bounded, and higher SNRs than $SNR_{high}$ do not need to be considered as energy consumption increases (time is fixed but higher SNR means unnecessary invested amount of transmit power).

Implementation Aspects

The control system implementing the control and adaptation of the considered link transmit parameters may reside in any node or sub-system of the communication network, but is preferably implemented in the transmitter or the receiver. In the following, it is assumed that the control system resides in the transmitter, but the invention is not limited hereto.

Figure 5:
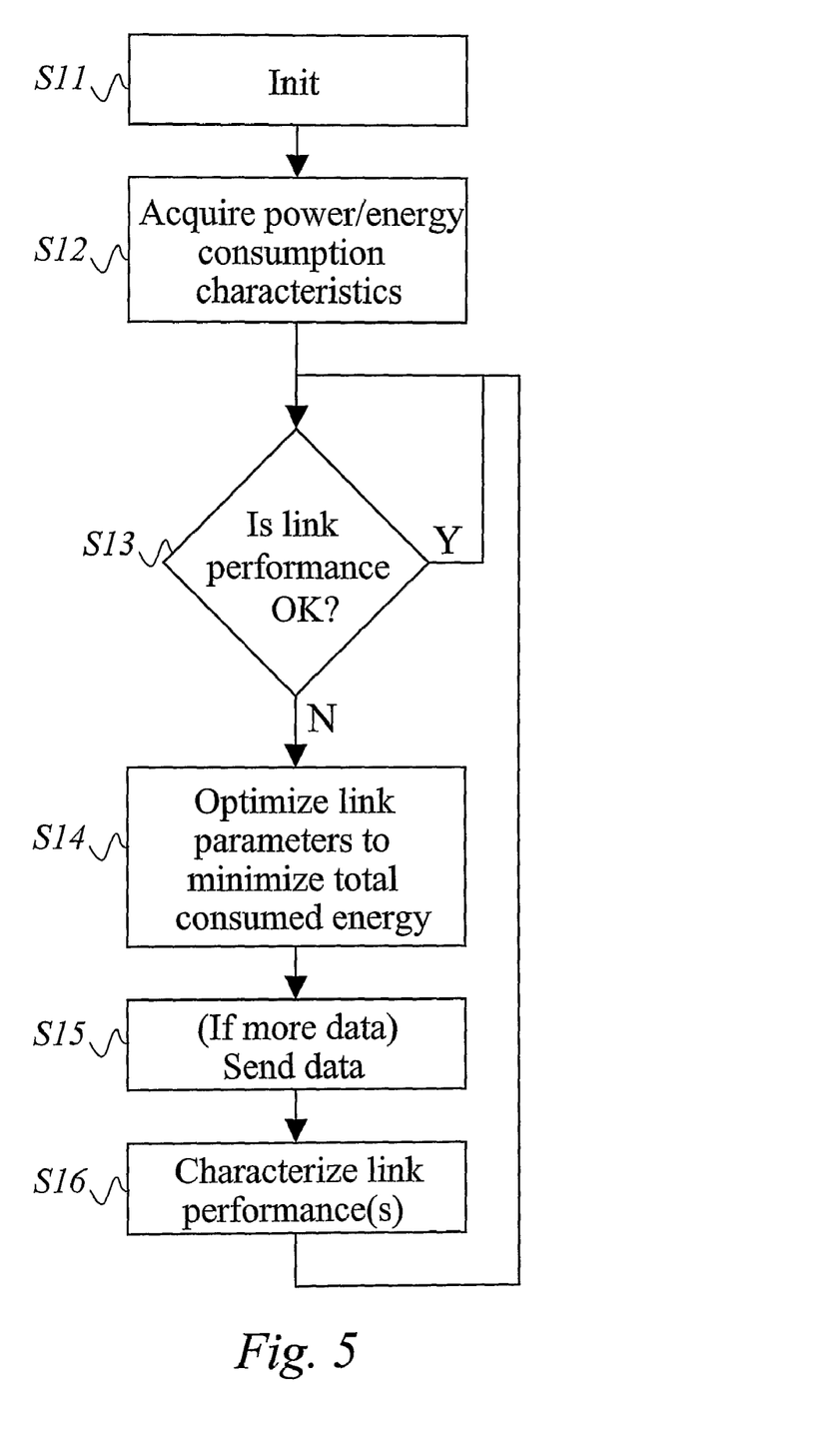
FIG. 5 is a schematic flow diagram illustrating control and adaptation of link transmit parameters according to a specific exemplary embodiment of the invention.

As outlined in the exemplary flow diagram of FIG. 5, the control and adaptation of link parameters is initiated in step S11. Next, the control system gathers or receives information on power consumption characteristics of the transmitter and receiver(s) such as information on the transmitter power amplifier efficiency and the radiation-unrelated power consumption for the transmitter and the receiver(s), as well as information on communication characteristics, as indicated in step S12. This may be a priori information more or less directly available to the control system. For example, the control system may have a priori information on power consumption of the transmitter and receiver, and possibly also on communication characteristics (e.g. historical or assumed values on communication quality). If the control system resides in the transmitter, it can be assumed that the control system has access to the necessary information on the transmitter's power consumption.

If the transmitter lacks any information on the receiver's power consumption or on the communication quality, it acquires this information from the receiver, for example by polling or receiving pushed information, about the receivers power consumption $P_0^{(RX)}$ (and potential other relevant parameters). This can be seen as capability information acquired by the transmitter, and it preferably only happens once when the devices meets the first time. When communication is to be initiated or is ongoing, the transmitter preferably acquires information on the parameter $\Gamma$ on a continuous basis and has knowledge of its own power consumption $P_0^{(TX)}$ as well as of the factor $\alpha$.

If the link performance is acceptable (S13, Y), it may not be necessary to perform any power or link mode adaptation. However, if the link performance needs to be adapted (S13, N) optimization may be required. In step S14, the control system in the transmitter optimizes the link transmit parameters so as to minimize the total consumed energy based on the relevant input parameters.

In order to keep the information on communication characteristics or link performance up-to-date, it is advantageous to continuously measure the link performance characteristics, as indicated in the optional but highly preferred step S16.

Figure 6:
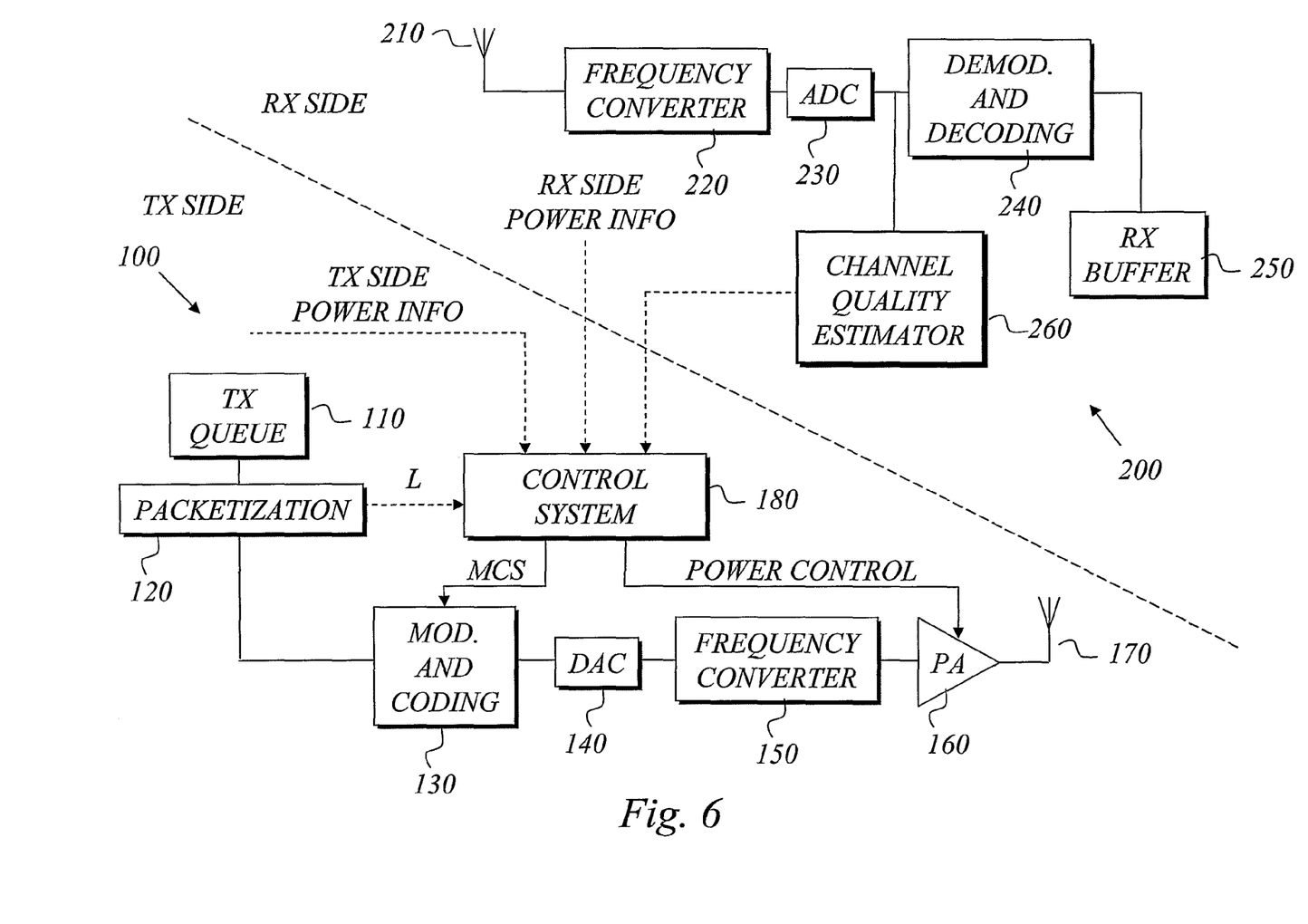
FIG. 6 is a schematic block diagram illustrating the relevant parts of a transmitter and a receiver according to an exemplary preferred embodiment of the invention.

FIG. 6 is a schematic block diagram illustrating the relevant parts of a transmitter and a receiver according to an exemplary preferred embodiment of the invention. On the transmitting side, the exemplary transmitter 100 comprises a transmission queue 110, a packetization unit 120, a modulation and coding unit 130, a digital-to-analog converter (DAC) 140, a frequency converter 150 and a power amplifier (PA) 160 connected to an antenna system 170, as well as a control system 180. Preferably, the control system 180 gathers or receives information on power consumption characteristics of the transmitter and receiver(s). This may be a priori information more or less directly available to the control system. For example, one may assume that the control system has access to the necessary information on the transmitter's power consumption, such as information on the transmitter power amplifier efficiency and the radiation-unrelated power consumption of the transmitter. If the transmitter lacks any information on the receiver's power consumption or on the communication quality, it acquires this information from the receiver side, for example by polling or receiving pushed information. The control system 180 may also receive additional information such as information on packet length L from the packetization unit 120. The control system 180 then determines transmit duration and transmit power based on minimization of overall consumed energy for both the transmitter and the receiver, using relevant input information. The control system 180 controls the power level of the power amplifier based on the determined value of the transmit power parameter. The control system also decides on a suitable modulation and coding scheme (MCS) and/or other signal and protocol parameters for link adaptation. The determined value of the transmit duration parameter is translated into a data rate, which is finally mapped into a suitable modulation and coding scheme.

On the receiving side, the receiver 200 comprises an antenna system 210, a frequency converter 220, an analog-to-digital converter (ADC) 230, a demodulation and decoding unit 240, a receive buffer 250, and a channel quality estimator 260 or equivalent module for characterizing communication quality or link performance.

Naturally, as understood by the skilled person, the transmitter includes conventional circuitry for receiving information, and the receiver includes conventional circuitry for transmitting information. For reasons of simplicity and clarity, these parts are not shown in FIG. 6. Alternatively, the control system resides on the receiving side. For example, a receiving station may control the link parameters, and signal the desired change in link rate and transmit power to the transmitter. In this way, the receiver can more directly ensure that the receiving quality is satisfactory. In this case, the receiver has preferably acquired a model of the transmitter's parameters $P_0^{(TX)}$ and $\alpha$. The receiver may also adapt the transmit power and link rate to cater for packets in error, and hence optimize the mean consumed energy of the system.

Performance Example

To give some performance estimate, and a sense of operating range, the parameters in (2) were assumed to be:
- $\alpha=4$. This is an estimation of the power amplifier's efficiency, i.e. assumed to be 25%.
- $P_0=2\cdot 4\cdot 10^{\wedge}(P_{LO}/10)$ mW·$P_{LO}=+7$ dBm is the mixer's required local oscillator (LO) power level (here assumed to be low since it is a low power application that is targeted). The extreme mixers range up to $P_{LO}=+27$ dBm). The factor 4 is included for estimating the efficiency of the LO plus other RF and baseband circuitry. The factor 2 accounts for LOs on both the transmitter and receiver side.
- $\Gamma=G/W$ where the path gain was set to $G=\{-40,-100\}$ dB, and the noise (and interference) level was $W=kTBN_F$, where $k=1.38e-23$, $T=273+25$, $B=100$ MHz, and $N_F=6$ dB.
- $T_0=0$.

Figure 7:
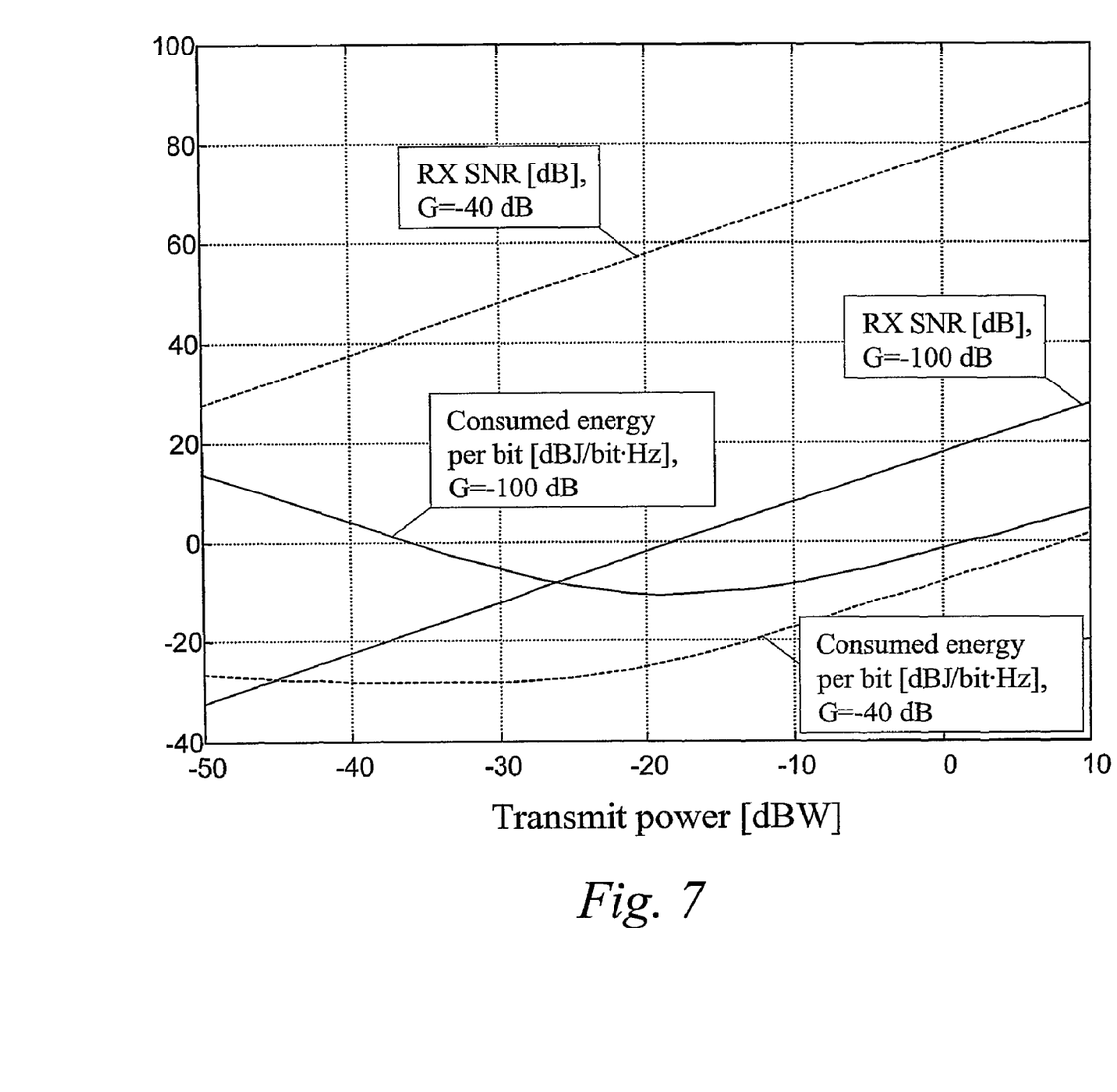
FIG. 7 is a schematic diagram illustrating curves of energy consumption and receiver SNR as a function of transmit power according to an exemplary embodiment of the invention.

FIG. 7 is a schematic diagram illustrating curves of energy consumption and receiver SNR as a function of transmit power according to an exemplary embodiment of the invention. The consumed energy is plotted as well as the resulting receiver SNR as a function of the transmit power. It is noted that for a high gain (G=−40 dB), the energy consumption minima is fairly broad. Hence, one may prefer to use a lower transmit power that results in a receiver (RX) SNR that is more viable from demodulation and decoding point of view, e.g. less than 30 dB.

Whilst consumed energy has been used as performance criterion here, it is noted that the receiver SNRs are in such ranges that the data rate will be acceptable, i.e. the throughput performance is not severely affected by the proposed optimization method or metric.

Extension to Routing—Using Consumed Energy as Link Cost

In another aspect of the invention, an extension is also made to multiple hops where consumed energy is used as link metric, given the freedom of varying both power and transmit duration.

The minimum consumed energy for both the transmitter and the receiver(s) per link may also be used as a link cost for a multihop network. For instance, the new link cost metric may be used together with a shortest path algorithm and protocol, such as Dijkstra and Bellman-Ford, to find the route offering the least consumed energy.

This aspect of the invention is generally applicable to any routing protocol, independent of implementation, including both distributed and centralized routing algorithms, hop-by-hop routing as well as source-routing, link-state routing and distance-vector routing (also sometimes referred to as Bellman-Ford algorithm based routing), pro-active or reactive routing, flat or hierarchical routing, single path and multipath routing, as well as variations and combinations thereof.

In source-routing it is normally assumed that the source end node determines the entire route. The intermediate nodes then merely act as store-and-forward units, mindlessly forwarding the packet to the next node on the path to the destination node.

In hop-by-hop routing, each node basically determines and maintains a routing table with information, for each of a number of destinations, of a preferred next hop node. When a node receives a packet, it forwards the packet to the next hop node on the basis of information on the destination of the packet. The forwarding process continues from node to node until the packet reaches the destination.

The network nodes pass routing information and maintain their routing tables through the transfer of various routing information messages. The routing information naturally varies depending on the particular routing scheme used.

Hop-by-hop routing schemes are normally categorized into two main classes, namely link-state and distance-vector algorithms. Link-state algorithms generally flood routing information to all nodes (however solutions flooding only part of the network also exist), but each node then only sends information describing the state of its own links. Distance vector algorithms on the other hand are based on exchanging routing cost information only between neighboring nodes.

The manner in which the routing tables are determined and updated may differ from one routing scheme to another. However, a common objective is normally to find the path that is optimal in some sense.

A classical approach is to span a so-called shortest path multihop tree between a source node and a destination node, where each link is characterized by a delta cost, and each node is assigned an accumulated cost to reach the destination along the determined shortest path. It should be clear that the expression "shortest path" normally corresponds to a minimum cost path, which emphasizes that the path or route is a path that offers the minimum cost with respect to some particular cost metric.

The Bellman-Ford shortest path algorithm will be used as an example of a shortest path algorithm in the following, although the Dijkstra algorithm, or any other routing algorithm for that matter, could be used as well. The Bellman-Ford algorithm has played a central role in wired networks such as the Internet, but also has an important function in wireless multihop networks. In a commonly preferred implementation, the Bellman-Ford algorithm provides shortest path determination in a distributed and "uncoordinated" fashion and guarantees convergence within a finite time period based on the exchange of routing cost information between neighboring nodes.

For the Bellman Ford algorithm, the cost $C_i$ of a node $v_i$ for each destination d of a given set of destinations may thus be determined through the distributed Bellman Ford equation:

$$C_i^{(d)} = \min_{\forall j \in N_l} \{\Delta C_{ij} + C_j^{(d)}\}, \quad (8)$$

where $v_j \in N_i$ is the neighbor index of neighbor nodes belonging to node $v_i$, $C_j$ is the cost for neighbor $v_j$ to reach destination d, and $\Delta C_{ij}$ is the cost to go from node $v_i$ to $v_j$ (i.e. the cost for a hop, or the link cost).

The number of iterations may be limited to an integer number, thereby upper limiting the number of hops, e.g. a maximum of two hops.

As mentioned above, the Bellman-Ford algorithm is easily implemented in a distributed manner. A multihop tree between source and destination in a multihop network is built and defined based on routing cost information distributed in the network. In practice, neighboring nodes exchange routing lists. Each routing list contains multiple entries, where each entry specifies a destination node, the routing cost from the node in question to the destination as well as an indication of a next hop node. The routing list is typically sent in a packet, sometimes denoted as a Hello packet.

A node receiving a routing list, checks whether any entry offers a more optimum route than what the nodes own list indicates. Often, timestamps or sequence numbers are included together in the entry to ensure that the new cost information is not outdated state information.

To reduce the overhead of a distributed approach, it is also common practice to restrict routing cost information from propagating all over the network. For example, a maximum number of hops, only nodes within a certain region, or only nodes under the control of one Base Station (BS) may be allowed.

A basic idea in this aspect of the invention is to determine the link cost for a wireless link between a transmitter and at least one receiver based on minimization of a given objective function representative of total consumed energy, on both the transmitting side and the receiving side, for communication on said link with respect to at least one of transmit duration and transmit power of said transmitter. The link cost for other relevant wireless links are determined in one way or another, preferably in the same way based on minimization of the total consumed energy for communication on each considered link. The determined link cost information is subsequently used together with additional routing cost information (which may vary depending on the used route determination protocol) for route determination, thereby determining consumed-energy-optimal paths for routing information between different network nodes in the network. In the forwarding process, packets are forwarded from source to destination via a set of suitable intermediate nodes along a path determined during the route determination. In other words, route determination is performed at least partly based on minimum consumed energy per link for at least one wireless link. Data may then forwarded from a given node to at least a neighbor node on the path to the given destination node in accordance with the route determination.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] Laura Feeny and Martin Nilsson, "Investigating the Energy Consumption of a Wireless Network Interface in an Ad Hoc Networking Environment", Proceedings INFOCOM 2001, Anchorage, Ak., http://www.cs.cornell.edu/People/egs/615/feeney.pdf

[2] A. Simonsson, M. Almgren, M. Thurfjell, "A power control and scheduling concept for EGPRS", in Proceedings of Vehicular Technology Conference, 2000. IEEE VTS-Fall VTC 2000. 52$^{nd}$, pp. 2219-2224 vol. 5.

The invention claimed is:

1. A method of controlling transmit parameters for wireless communication between a transmitter and at least one receiver, comprising:
   collectively determining transmit duration and transmit power based on minimization of a given objective function with respect to at least one of transmit duration and transmit power, and
   wherein the given object function is representative of total consumed energy for said transmitter and said at least one receiver;
   wherein the total consumed energy includes an energy term defined as:

$(aP+P_0) \cdot T$, where a is a factor used to reflect the power amplifier efficiency at the transmitter, P is the variable transmit power, $P_0$ is a constant term attributed to radiation-unrelated power consumption at the receiver and the transmitter, and T is the variable transmit duration; and
   wherein the variable transmit duration T (per bit) is defined as:

$$\frac{L}{B \cdot f(\Gamma, P)}$$

where L is the number of bits in a packet, B is the link bandwidth, f is a piecewise monotonically increasing function, and Γ is representative of local link characteristics.

2. The method of claim 1, further comprising the step of performing joint link adaptation and power control based on the determined transmit duration and transmit power.

3. The method of claim 1, wherein the total consumed energy is defined based on transmit duration, transmit power during the communication as well as radiation-unrelated consumed power on the transmitting side and the receiving side.

4. The method of claim 3, wherein said radiation-unrelated consumed power is related to hardware-based processing at transmission and reception.

5. The method of claim 3, wherein said radiation-unrelated consumed power is estimated as constant.

6. The method of claim 1, wherein said objective function is minimized with respect to both transmit duration and transmit power, which are variable independently of each other.

7. The method of claim 1, wherein said objective function is minimized with respect to a first transmit parameter selected as transmit duration or transmit power, and the other second transmit parameter of transmit duration or transmit power is determined as a function of the first transmit parameter.

8. The method of claim 1, wherein said step of determining transmit duration and transmit power is also based on expected communication quality.

9. The method of claim 1, wherein a model representative of the energy consumption for a node is made known to another node responsible for minimizing the total consumed energy.

10. The method of claim 1, wherein said control system collectively determines transmit duration and transmit power based on information on power consumption characteristics of said transmitter and said at least one receiver, as well as information on communication characteristics.

11. A method of controlling transmit parameters for wireless communication between a transmitter and at least one receiver, comprising:
    collectively determining transmit duration and transmit power based on minimization of a given objective function with respect to at least one of transmit duration and transmit power, and
    wherein the given object function is representative of total consumed energy for said transmitter and said at least one receiver;
    wherein the total consumed energy includes an energy term defined as:

$$(aP+P_0) \cdot T,$$

where a is a factor used to reflect the power amplifier efficiency the transmitter, P is the variable transmit power, $P_0$ is a constant term attributed to radiation-unrelated power consumption at the receiver and the transmitter, and T is the variable transmit duration; and
    wherein the variable transmit duration T (per bit) is defined as:

$$\left( \frac{L}{B \log_2(1 + \Gamma P)} \right)$$

where L is the number of bits in a packet, B is the link bandwidth, and $\Gamma$ is representative of local link characteristics.

12. An arrangement for controlling transmit parameters for wireless communication between a transmitter and at least one receiver, comprising:
    a control system operable for collectively determining transmit duration and transmit power based on minimization of a given objective function with respect to at least one of transmit duration and transmit power, and
    wherein the given objective function is representative of total consumed energy, on both the transmitting side and the receiving side;
    wherein the total consumed energy includes an energy term defined as:

$$(aP+P_0) \cdot T,$$

where a is a factor used to reflect the power amplifier efficiency at the transmitter, P is the variable transmit power, $P_0$ is a constant term attributed to radiation-unrelated power consumption at the receiver and the transmitter, and T is the variable transmit duration; and
    wherein the variable transmit duration T (per bit) is estimated as:

$$\frac{L}{B \cdot f(\Gamma, P)}$$

where L is the number of bits in a packet, B is the link bandwidth, f is a piecewise monotonically increasing function, and $\Gamma$ is representative of local link characteristics.

13. The arrangement of claim 12, wherein said control system is operable for performing joint link adaptation and power control based on the determined transmit duration and transmit power.

14. The arrangement of claim 12, wherein said control system is operable for estimating the total consumed energy based on transmit duration, transmit power during the communication as well as radiation-unrelated consumed power on the transmitting side and the receiving side.

15. The arrangement of claim 14, wherein said radiation-unrelated consumed power is related to hardware-based processing at transmission and reception.

16. The arrangement of claim 14, wherein said radiation-unrelated consumed power is estimated as constant.

17. The arrangement of claim 12, wherein said control system is operable for minimizing said objective function with respect to both transmit duration and transmit power, which are variable independently of each other.

18. The arrangement of claim 12, wherein said control system is operable for minimizing said objective function with respect to a first transmit parameter selected as one of transmit duration and transmit power, and for determining the other second transmit parameter of transmit duration or transmit power as a function of the first transmit parameter.

19. The arrangement of claim 12, wherein said control system is operable for determining transmit duration and transmit power also based on expected communication quality.

20. The arrangement of claim 12, further comprising means for transferring a model representative of the energy consumption for a node to another node responsible for minimizing the total consumed energy.

21. The arrangement of claim 12, wherein said control system is operable for collectively determining transmit duration and transmit power based on information on power consumption characteristics of said transmitter and said at least one receiver, as well as information on communication characteristics.

22. The arrangement of claim 12, wherein said arrangement is implemented in said transmitter, and said transmitter is operable for acquiring information on the power consumption of said at least one receiver, as well as information on communication characteristics.

23. An arrangement for controlling transmit parameters for wireless communication between a transmitter and at least one receiver, comprising:

a control system operable for collectively determining transmit duration and transmit power based on minimization of a given objective function with respect to at least one of transmit duration and transmit power, and wherein the given objective function is representative of total consumed energy, on both the transmitting side and the receiving side;

wherein the total consumed ever includes an energy term defined as:

$(aP+P_0) \cdot T$, where a is a factor used to reflect the power amplifier efficiency at the transmitter, P is the variable transmit power, $P_0$ is a constant term attributed to radiation-unrelated power consumption at the receiver and the transmitter, and T is the variable transmit duration; and wherein the variable transmit duration T (per bit) is estimated as:

$$\left( \frac{L}{B \lg_2(1+\Gamma P)} \right)$$

where L is the number of bits in a packet, B is the link bandwidth, and $\Gamma$ is representative of local link characteristics.

24. The arrangement of claim 12, wherein said transmitter is operable for communication with a receiver on a unicast link.

25. The arrangement of claim 12, wherein said transmitter is operable for communication with multiple receivers on a multicast link.

26. The arrangement of claim 12, wherein said transmitter and said at least one receiver are battery-driven short-range communicating devices.

27. A method of determining link cost for routing in a wireless communication network, comprising determining link cost for a link between a transmitter and at least one receiver based on minimization of a given objective function representative of total consumed energy, on both the transmitting side and the receiving side, for communication on said link with respect to at least one of transmit duration and transmit power of said transmitter;

wherein the total consumed energy includes an energy term defined as:

$(aP+P_0) \cdot T$, where a is a factor used to reflect the power amplifier efficiency at the transmitter, P is the variable transmit power, $P_0$ is a constant term attributed to radiation-unrelated power consumption at the receiver and the transmitter, and T is the variable transmit duration; and wherein the variable transmit duration T (per bit) is defined as:

$$\frac{L}{B \cdot f(\Gamma, P)}$$

where L is the number of bits in a packet, B is the link bandwidth f is a piecewise monotonically increasing function, and $\Gamma$ is representative of local link characteristics.

28. An arrangement for determining link cost for routing in a wireless communication network, comprising means for determining link cost for a link between a transmitter and at least one receiver based on minimization of a given objective function representative of total consumed energy, on both the transmitting side and the receiving side, for communication on said link with respect to at least one of transmit duration and transmit power of said transmitter;

wherein the total consumed energy includes an energy term defined as:

$(aP+P_0) \cdot T$, where a is a factor used to reflect the power amplifier efficiency at the transmitter, P is the variable transmit power, $P_0$ is a constant term attributed to radiation-unrelated power consumption at the receiver and the transmitter, and T is the variable transmit duration; and wherein the variable transmit duration T (per bit) is defined as:

$$\frac{L}{B \cdot f(\Gamma, P)}$$

where L is the number of bits in a packet B is the link bandwidth, f is a piecewise monotonically increasing function, and $\Gamma$ is representative of local link characteristics.

* * * * *

UNITED STATES PATENT AND TRADEMARK OFFICE
CERTIFICATE OF CORRECTION

PATENT NO. : 8,391,802 B2  
APPLICATION NO. : 12/278851  
DATED : March 5, 2013  
INVENTOR(S) : Larsson et al.

Page 1 of 2

It is certified that error appears in the above-identified patent and that said Letters Patent is hereby corrected as shown below:

On the Title Page, Item (56), under "U.S. PATENT DOCUMENTS", in Column 2, below Entry 1, Line 2, insert -- 2009/0052327 A1 2/2006 Larsson, et al --.

On the Title Page, Item (56), in Column 2, below "U.S. PATENT DOCUMENTS", insert -- OTHER PUBLICATIONS  
Cui S., et al., Joint Routing, MAC, and Link Layer Optimization in Sensor Networks with Energy Constraints, Communications, 2005, May 16, 2005, South Korea. --.

In the Specifications

In Column 6, Line 17, delete "$\alpha$" and insert -- a --, therefor.

In Column 6, Line 19, delete "$\alpha>1$." and insert -- $a>1$. --, therefor.

In Column 6, Line 46, delete "$\alpha P_0^{-1}$," and insert -- $aP_0^{-1}$, --, therefor.

In Column 6, Line 50, delete "$\alpha P_0^{-1}$." and insert -- $aP_0^{-1}$. --, therefor.

In Column 6, Line 63, in Equation (6), delete "$\alpha P_0^{-1},\Gamma,P)$," and insert -- $aP_0^{-1},\Gamma,P)$, --, therefor.

In Column 7, Line 67, delete "$\alpha P_0^{-1}$." and insert -- $aP_0^{-1}$. --, therefor.

In Column 8, Line 48, delete "$\alpha$." and insert -- a. --, therefor.

In Column 9, Lines 37-46, delete "Alternatively, the........of the system." and insert the same at Line 38 as a new paragraph.

In Column 9, Line 44, delete "$\alpha$." and insert -- a. --, therefor.

Signed and Sealed this  
Eleventh Day of June, 2013

Teresa Stanek Rea  
*Acting Director of the United States Patent and Trademark Office*

CERTIFICATE OF CORRECTION (continued)
U.S. Pat. No. 8,391,802 B2

In Column 9, Line 50, delete "$\alpha=4$." and insert -- $a=4$. --, therefor.

In Column 9, Line 56, delete "dBm)." and insert -- dBm. --, therefor.

In Column 11, Line 26, delete "$C_i$;" and insert -- $C_j$ --, therefor.

In the Claims

In Column 12, Line 65, in Claim 3, delete "radiation- unrelated" and insert -- radiation-unrelated --, therefor.

In Column 13, Line 44, in Claim 11, delete "efficiency the" and insert -- efficiency at the --, therefor.

In Column 13, Line 45, in Claim 11, delete "$P_0$is a" and insert -- $P_0$ is a --, therefor.

In Column 16, Line 15, in Claim 27, delete "bandwidth" and insert -- bandwidth, --, therefor.